(12) United States Patent
Natsukari et al.

(10) Patent No.: US 8,087,682 B2
(45) Date of Patent: Jan. 3, 2012

(54) SUSPENSION DEVICE FOR A WHEEL AND METHOD FOR SUPPORTING A WHEEL

(75) Inventors: Maho Natsukari, Sagamihara (JP); Yusuke Kageyama, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 344 days.

(21) Appl. No.: 12/525,472

(22) PCT Filed: Apr. 2, 2008

(86) PCT No.: PCT/IB2008/000791
§ 371 (c)(1),
(2), (4) Date: Jul. 31, 2009

(87) PCT Pub. No.: WO2008/122857
PCT Pub. Date: Oct. 16, 2008

(65) Prior Publication Data
US 2010/0001486 A1 Jan. 7, 2010

(30) Foreign Application Priority Data

Apr. 4, 2007 (JP) ................................. 2007-098525
Apr. 27, 2007 (JP) ................................. 2007-119884

(51) Int. Cl.
*B60G 3/20* (2006.01)
(52) U.S. Cl. .............................................. 280/124.143

(58) Field of Classification Search ........... 280/124.134, 280/124.135, 124.136, 124.143, 124.144, 280/124.15, 124.153
See application file for complete search history.

(56) References Cited

U.S. PATENT DOCUMENTS

| 4,681,342 A | 7/1987 | Goeerich |
| 4,772,043 A | 9/1988 | Muramatsu |
| 4,828,279 A * | 5/1989 | Matschinsky .......... 280/124.143 |
| 6,099,005 A * | 8/2000 | Wakatsuki ............. 280/124.135 |
| 6,588,779 B2 * | 7/2003 | Sandahl et al. ........ 280/124.135 |
| 2005/0140110 A1 * | 6/2005 | Lee et al. ............... 280/124.109 |

FOREIGN PATENT DOCUMENTS

| JP | 58-145416 | 8/1983 |
| JP | 61-247504 | 11/1986 |
| JP | 62-234705 | 10/1987 |
| JP | 02-164608 | 6/1990 |
| JP | 07-332417 | 12/1995 |
| JP | 2000-203228 | 7/2000 |

* cited by examiner

Primary Examiner — Paul N Dickson
Assistant Examiner — Robert A Coker
(74) Attorney, Agent, or Firm — Young Basile

(57) ABSTRACT

A suspension device includes a first and a second link that link a vehicle-body side member and a wheel supporting member to each other. The two links are linked to each other through an elastic linking portion. The rigidity of an elastic bush thereof is less than the rigidity of an elastic member of a linking portion of at least one of the two links with the wheel supporting member and the vehicle-body side member.

19 Claims, 8 Drawing Sheets

BUSH AXIAL DIRECTION

FIG. 8A
FIG. 8B
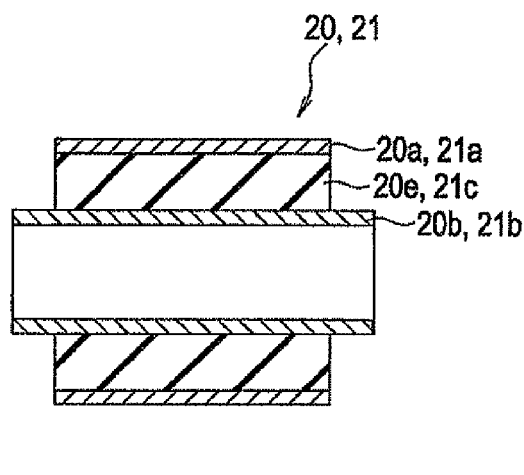
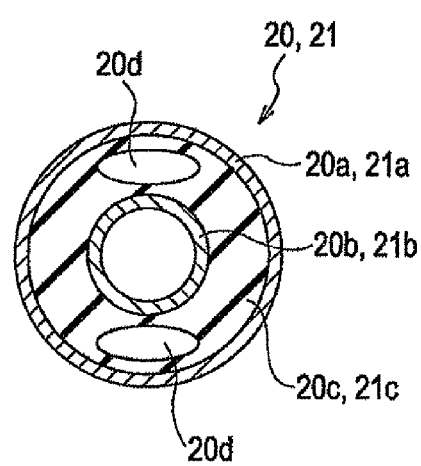
FIG. 9A
FIG. 9B
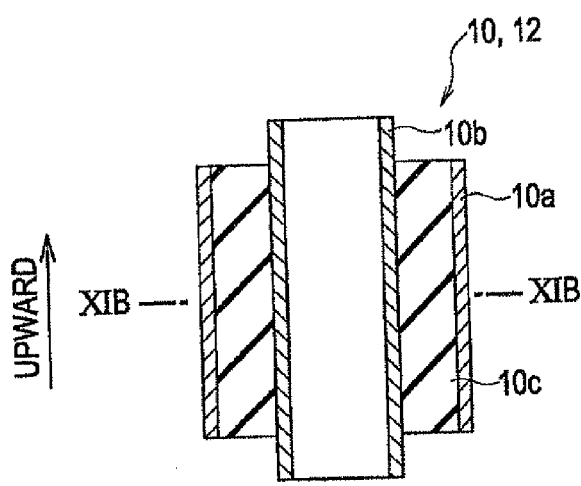
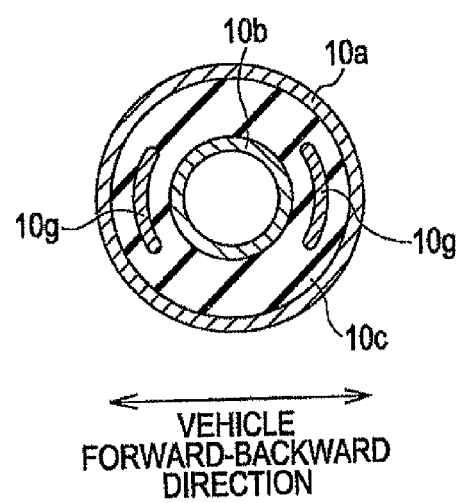

SUSPENSION DEVICE FOR A WHEEL AND METHOD FOR SUPPORTING A WHEEL

CROSS REFERENCE RELATED TO APPLICATIONS

This application claims priority to Japanese Patent Application Serial Nos. 2007-098525, filed Apr. 4, 2007, and 2007-119884, filed Apr. 27, 2007, each of which is incorporated herein in its entirety by reference.

TECHNICAL FIELD

The present invention relates to a suspension device and a method for supporting a wheel on a vehicle.

BACKGROUND

A suspension device for rear wheels is discussed in, for example, Japanese Unexamined Patent Application Publication No. 62-234705. That device comprises a pair of rigid arms and a linking member. The pair of rigid arms links a vehicle-body side member and a lower area of a wheel supporting member, and the rigid arms are disposed apart from each other in a vehicle forward-backward direction. The linking member is provided between the pair of rigid arms and is rigidly linked to the pair of rigid arms.

The wheel supporting member and the vehicle-body side member are linked to the ends of the rigid arms by elastic bushes. As a result, the rigid arms are swingable relative to the wheel supporting member and vehicle-body side member, thereby allowing relative vertical movement between the wheel supporting member and vehicle-body side member.

BRIEF SUMMARY

The present invention provides a suspension device and method for suspending wheels. According to one embodiment of a suspension device taught herein, a wheel supporting member is configured to rotatably support a wheel, a first link and a second link respectively link the wheel supporting member and a vehicle-body side member and are disposed substantially in parallel in a vehicle width direction, a first elastic member is disposed between and linking the first link and the wheel supporting member, a second elastic member is disposed between and linking the first link and the vehicle-body side member, and a projecting portion extending from the first link towards the second link. An elastic linking portion links the projecting portion of the first link to the second link and has a rigidity less than a rigidity of the first elastic member and a rigidity of the second elastic member.

Another suspension device for a wheel supporting member configured to rotatably support a wheel taught herein comprises first means for linking the wheel supporting member and a vehicle-body side member, second means for linking the wheel supporting member and the vehicle-body side member, the second linking means disposed substantially in parallel with the first linking means in a vehicle width direction, means for increasing a relative displacement between the first means for linking and the second means for linking, means for generating a force in accordance with a change in the relative displacement wherein the relative displacement includes a periodic displacement and means for generating a counter force in accordance with the periodic displacement included in the relative displacement.

Methods of suspending a wheel rotatably supported by a wheel supporting member are also taught herein. By example, one such method includes displacing two links relative to each other in accordance with a displacement of the wheel supporting member in a vehicle forward-backward direction, the two links linking the wheel supporting member and a vehicle-body side member to each other and disposed substantially in parallel in a vehicle width direction. This method also includes generating a damping force responsive to a periodic displacement included in the displacement wherein generating the damping force includes generating a greater force component at a location where one of the two links is linked to one of the wheel supporting member and the vehicle-body side member than at a location where the two links are linked to each other.

BRIEF DESCRIPTION OF THE DRAWINGS

FIGS. 8A and 8B illustrate a structure of a connect bush; and

FIGS. 9A and 9B are sectional views illustrating a structure of an elastic bush including a rigidity increasing mechanism.

DETAILED DESCRIPTION OF EMBODIMENTS OF THE INVENTION

Figure 1:
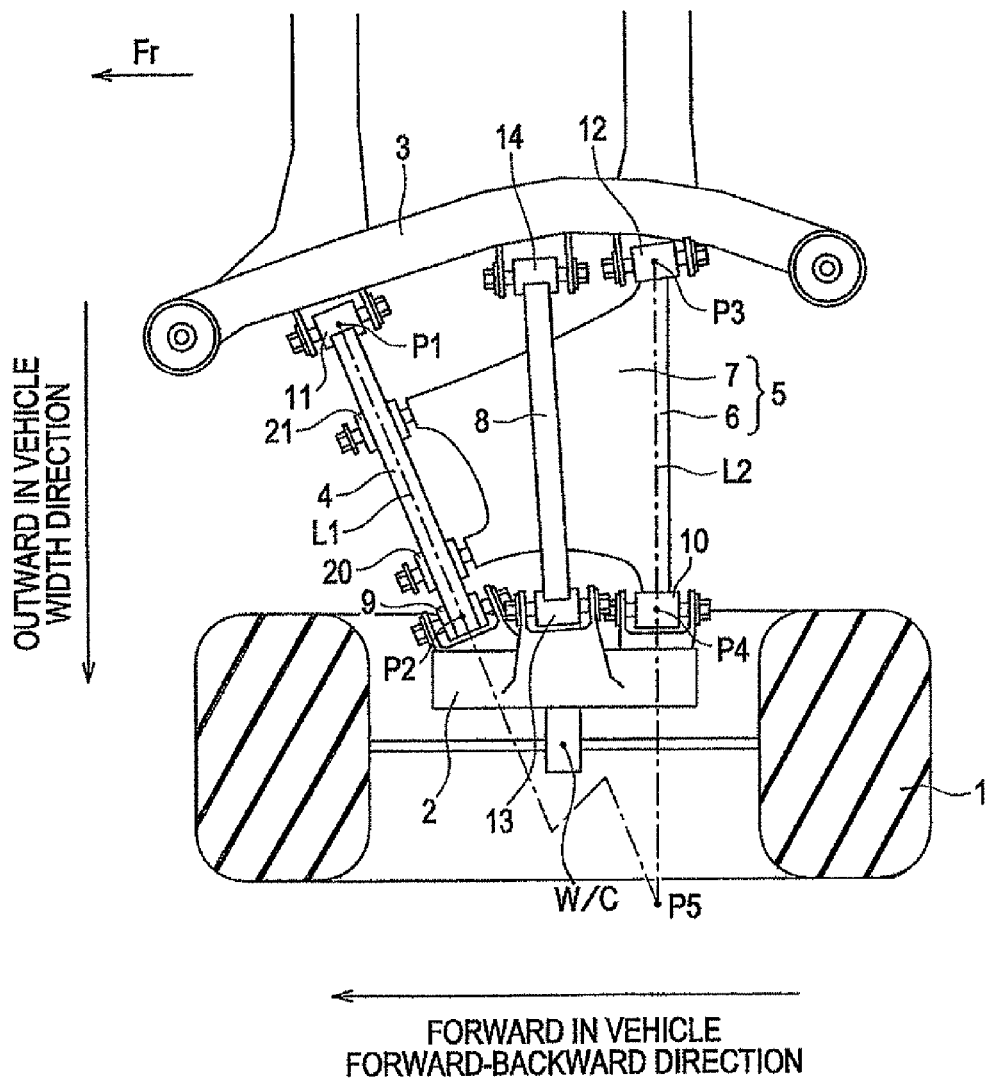
FIG. 1 is a top view of a suspension device for a vehicle wheel according to various embodiments of the invention.

One ride-quality performance of a vehicle is related to forward-backward vibration of a vehicle floor. Decreasing the peak amplitude of the vibration improves ride-quality. Considering that a forward-backward input to a vehicle suspension is a large factor in causing the forward-backward vibration of a vehicle floor, the forward-backward input to a vehicle suspension has hitherto been restricted for the purpose of reducing the forward-backward vibration of the floor. In the related art, a forward-backward rigidity of the suspension is made small by linking a suspension link to a suspension member using a bush with a small forward-backward rigidity, thereby restricting vibration of the suspension generated as a result of traveling over a protrusion. However, steering stability is reduced when the bush linking the suspension link to the suspension member has a small forward-backward rigidity.

Embodiments of a suspension device taught herein allow vibration of the vehicle floor in the vehicle forward-backward direction to be kept low while retaining steering stability and are initially described with reference to FIGS. 1 and 2.

The suspension device comprises two lower links 4 and 5 and an upper link 8. The lower links 4 and 5 link a lower area of an axle 2, which rotatably supports a wheel 1, and a suspension member 3, which is a vehicle-body side member. The upper link 8 links an upper area of the axle 2 and the suspension member 3.

The two lower links 4 and 5 are mounted to the axle 2 by one elastic bush 9 and one elastic bush 10, respectively, so that the lower links 4 and 5 are swingable vertically relative to the axle 2. The two lower links 4 and 5 are linked to the suspension member 3 through one elastic bush 11 and one elastic bush 12, respectively, so that the lower links 4 and 5 are swingable vertically relative to the suspension member 3. The upper link 8 is mounted to the axle 2 by one elastic bush 13 so as to be swingable vertically relative to the axle 2 and is linked to the suspension member 3 by one elastic bush 14 so as to be swingable vertically relative to the suspension member 3.

The two lower links 4 and 5 are disposed substantially in parallel in a vehicle width direction. When the two lower links 4 and 5 are to be distinguished in the description, the lower link 4 at the front side in the vehicle forward-backward direction is called the "front lower link 4," and the lower link 5 at the rear side in the vehicle forward-backward direction is called the "rear lower link 5."

The elastic bushes 9 to 14 comprise elastic members that are formed of rubber and inserted between outer cylinders and respective inner cylinders of the bushes 9 to 14 so as to be disposed in a nesting state. The outer cylinder sides are secured to ends of the links 4, 5 and 8, and the inner cylinder sides are mounted to the suspension member 3 or the axle 2 through bolts.

The front lower link 4 is a rod member extending linearly along a link axial line L1, and the elastic bushes 9 and 11 are provided at mounting portions at the respective ends of the front lower link 4.

The rear lower link 5 comprises a link body 6 and a projecting portion 7. The link body 6 extends along a link axial line L2. The projecting portion 7 is integrated with the link body 6 and projects towards the front in the vehicle forward-backward direction from the link body 6 towards the front lower link 4. In FIG. 1, the projecting portion 7 is a plate member that has a substantially trapezoidal shape in top view. The projecting portion 7 need not be a plate member. It may have any structure that projects from the link body 6 towards the front lower link 4.

An end of the projecting portion 7 is linked to the front lower link 4 through two elastic bushes 20 and 21 disposed in an offset manner in a vehicle width direction. In the embodiment, the elastic bushes 20 and 21 are, in top view, disposed with the bush axes being oriented in substantially the vehicle forward-backward direction (that is, in a direction perpendicular to the link axial line L1). The outer cylinders of the bushes 20 and 21 are secured to the front lower link 4, and the inner cylinders of the bushes 20 and 21 are secured to the projecting portion 7 through mounting bolts. Accordingly, the front lower link 4 and the rear lower link 5 are linked to each other so as to be swingable three-dimensionally by the elastic bushes 20 and 21 (which are linking portions). In addition, the amounts the links 4 and 5 can swing are restricted to certain amounts due to, for example, the span between the outer and inner cylinders and the rigidity of the elastic members.

In addition, in top view, the lower links 4 and 5 are disposed so that the span in the vehicle forward-backward direction between mounting points of the respective lower links 4 and 5 to the axle 2 (hereunder simply referred to as "wheel-side mounting points P2 and P4") is less than the span in the vehicle forward-backward direction between mounting points of the respective lower links 4 and 5 to the suspension member 3 (hereunder simply referred to as "vehicle-body side mounting points P1 and P3"). That is, in top view, an intersection P5 of the axial line L1 (connecting the wheel-side mounting point P2 and the vehicle-body side mounting point P1 of the lower link 4) and the axial line L2 (connecting the wheel-side mounting point P4 and the vehicle-body side mounting point P3 of the lower link 5) is set further outward than the axle 2 in the vehicle width direction, that is, further outward than the wheel-side mounting points P2 and P4 of the respective lower links 4 and 5 in the vehicle width direction.

In the embodiment shown in FIG. 1, in top view, an offset amount of the wheel-side mounting point P2 towards the back in the vehicle forward-backward direction with respect to the vehicle-body side mounting point P1 in the lower link 4 is larger than an offset amount (substantially zero in FIG. 1) of the wheel-side mounting point P4 towards the back in the vehicle forward-backward direction with respect to the vehicle-body side mounting point P3 in the rear lower link 5. In addition, the tilting of the link axial line L1 of the front lower link 4 towards the back in the vehicle forward-backward direction is larger than the tilting of the link axial line L2 of the rear lower link 5 towards the back in the vehicle forward-backward direction. Due to such a disposition, in top view, the shape defined by connecting four points, that is, the wheel-side mounting points P2 and P4 and the vehicle-body side mounting points P1 and P3, is substantially trapezoidal.

Accordingly, as a result of setting the offset amount of the wheel-side mounting point P2 of the front lower link 4 with respect to the vehicle-body side mounting point P1 of the front lower link 4 towards the back in the vehicle forward-backward direction greater than the offset amount of the wheel-side mounting point P4 of the rear lower link 5 with respect to the vehicle-body side mounting point P3 of the rear lower link 5 towards the back in the vehicle forward-backward direction, the intersection P5 of the link axial lines L1 and L2 of the respective lower links 4 and 5 is, in top view, disposed behind a center of the wheel 1 (wheel center W/C) in the vehicle front-backward direction.

The elastic bushes 20 and 21, which constitute the linking portions that swingably link the front lower link 4 and the projecting portion 7 to each other, are called "connect bushes 20 and 21." The elastic bushes 9 to 12, which link the lower links 4 and 5 to the axle 2 and the suspension member 3, are called "mounting bushes 9 to 12."

Figure 3A:
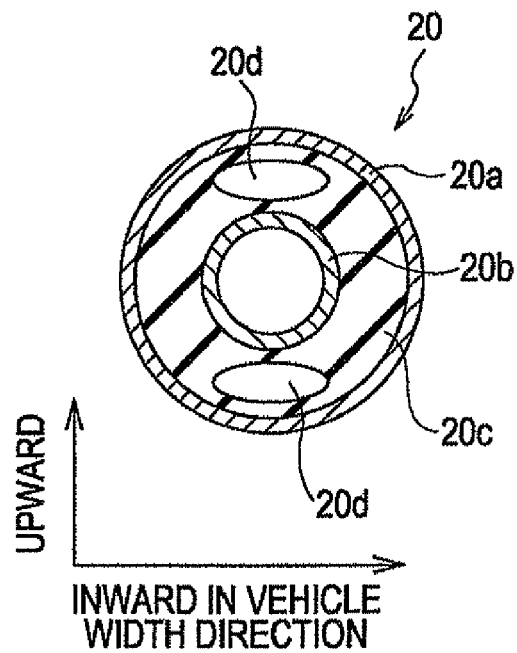
FIGS. 3A and 3B illustrate exemplary structures of connect bushes.

As mentioned above, the axes of the connect bushes 20 and 21 are set perpendicular to the link axial line L1 of the front lower link 4, that is, substantially in the vehicle forward-backward direction. As shown in FIG. 3A, the connect bush 20 is formed by interposing a rubber elastic member 20c between an inner cylinder 20b mounted to the projecting portion 7 and an outer cylinder 20a secured to the front lower link 4. The wheel-side connect bush 20 is provided with hollows 20d above and below the inner cylinder 20b in the vehicle height direction. Therefore, the wheel-side connect bush 20 has an anisotropic property in which the rigidity in the vertical direction is lowest.

Figure 3B:
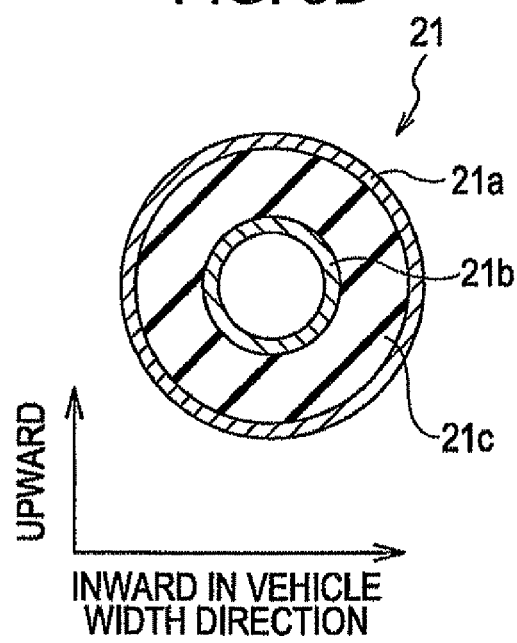

As shown in FIG. 3B, the connect bush 21 is formed by interposing a rubber elastic member 21c between an inner cylinder 21b mounted to the projecting portion 7 and an outer cylinder 21a secured to the front lower link 4. While not illustrated, it is possible for the vehicle-body side connect bush 21 to be provided with hollows 20d in the vertical direction similar to the wheel-side connect bush 20 shown in FIG. 3A so that the vehicle-body side connect bush 21 has an anisotropic property in which the vertical direction rigidity is relatively low.

The connect bushes 20 and 21 define an elastic center. The position of the elastic center varies depending upon the rigidity of the bushes 20 and 21. The elastic center is positioned between the connect bushes 20 and 21. That is, the wheel-side connect bush 20 is positioned closer to the axle 2 than the elastic center, and the vehicle-body side connect bush 21 is positioned closer to the suspension member 3 than the elastic center.

The rigidity of the mounting bushes 9 to 12 is higher than that of the connect bushes 20 and 21.

Here, the axle 2 constitutes a wheel supporting member, the suspension member 3 constitutes a vehicle-body side member, and the projecting portion 7 and the connect bushes 20 and 21 constitute a vibration damping mechanism.

Linking the two lower links 4 and 5 to each other makes it possible for an input to the wheel 1 in the vehicle forward-backward direction to be received by the two lower links 4 and 5. Therefore, it is not necessary to provide a different link for receiving the input in the vehicle forward-backward direction.

The two lower links 4 and 5 are linked to each other but can only swing within a predetermined range because the connect bushes 20 and 21 prevent swinging beyond the predetermined swinging range in at least the vehicle width direction with respect to an input to the wheels 1 in the vehicle forward-backward direction.

Figure 4:
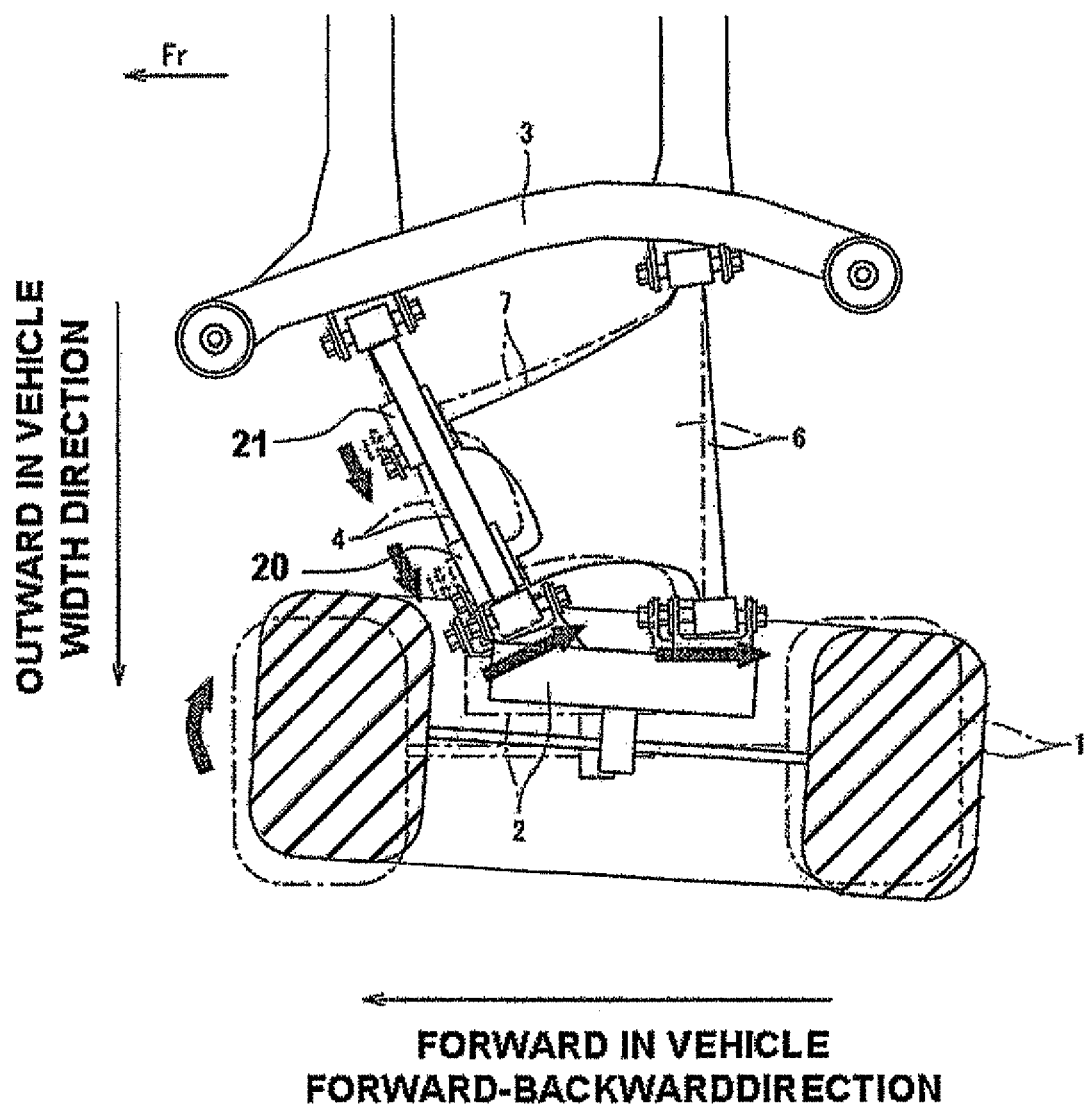
FIG. 4 is a top view of a behavior with respect to an input in a vehicle forward-backward direction.

As a result, the elastic members 20c and 21c of the connect bushes 20 and 21 flex with respect to the input to the wheel 1 in the forward-backward direction (forward-backward input to the wheel center W/C) due to an irregular road surface so that, as shown in FIG. 4, the inner cylinders 20b and 21b are swung and displaced in the vehicle width direction while being swung slightly in the vehicle forward-backward direction relative to the outer cylinders 20a and 21a. This causes the substantially trapezoidal shape in which the four points (that is, the wheel-side mounting points P2 and P4 and the vehicle-body side mounting points P1 and P3) are connected to be changed as seen in top view so that the rigidity in the vehicle forward-backward direction of the axle 2 supported at the two linked lower links 4 and 5 is set low. Therefore, shock when moving over a protrusion is reduced, thereby improving ride quality.

Figure 5:
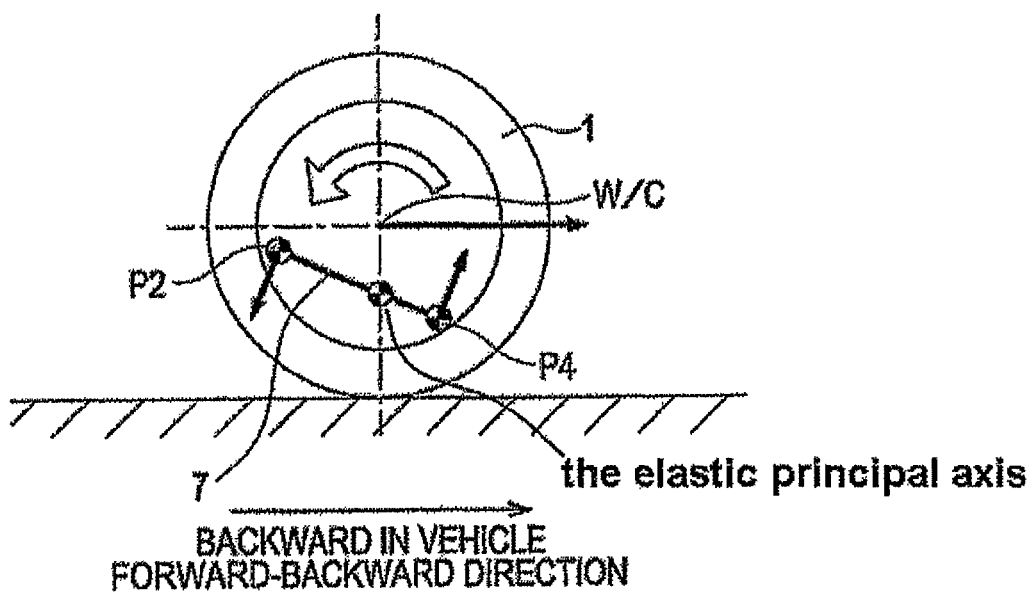
FIG. 5 is a side view showing the relationship between a wheel center and a rear lower link.

As shown in FIG. 5, a lever ratio results from the mounting points P2 and P4, i.e., where the lower links 4 and 5, respectively, are mounted to the axle 2, being disposed lower than the wheel center W/C. Thus, a portion of an input to the wheel 1 in the forward-backward direction (that is, a forward-backward input to the wheel center W/C) is converted into a force that vibrates the lower links 4 and 5 in a wind-up direction (that is, in substantially a vertical direction). The vertical vibration is input to the connect bushes 20 and 21 linking the lower links 4 and 5 to each other. Since the vertical rigidity of the wheel-side connect bush 20 is lower than its rigidity in the vehicle width direction, the wheel-side connect bush 20 allows displacement of both links 4 and 5 in the vehicle width direction and allows vertical vibration of the projecting portion 7 relative to the link 4. As a result, a wind-up rigidity of the suspension is reduced, and flexing and deformation of the connect bushes 20 and 21 from vertical swinging absorbs the vibration. Thus, a forward-backward vibration transmitted to the suspension member 3 from the links 4 and 5 (in particular, the rear lower link 5) is reduced. As a result, a forward-backward vibration of a floor is reduced, thereby improving ride quality.

When the vertical rigidity of only one of the two connect bushes 20 and 21 is low, it is desirable that the vertical rigidity of the wheel-side connect bush 20 be low. This is because the wheel-side connect bush 20 swings vertically by a large amount.

In addition, the connect bushes 20 and 21 flex with respect to the forward-backward direction input to absorb the input, thereby resulting in damping due to the characteristics of the rubber making up the connect bushes 20 and 21. Therefore, vibration with respect to the input in the forward-backward direction subsides properly.

Regarding the swinging of the connect bushes 20 and 21 when traveling over a protrusion, a large vertical swinging displacement primarily occurs at the wheel-side connect bush 20 in response to the wheel 1 twisting about an axis extending in the vehicle width direction to absorb the vibration. A swinging displacement in the vehicle width direction occurs at both the connect bushes 20 and 21 with respect to shearing to absorb the vibration.

Further, even if the lower links 4 and 5 are designed so as to satisfy strength requirements, the rigidity in the forward-backward direction is determined by the rigidity of the connect bushes 20 and 21 so that the degree of design freedom can be increased.

That is, the rigidity with respect to the input in the forward-backward direction of the suspension can be set low as a result of the connect bushes 20 and 21 flexing with respect to the forward-backward direction input to the wheel 1, even though the two lower links 4 and 5 are connected to each other and are made to receive the forward-backward direction input to the wheel 1 to reduce shock resulting from, for example, an irregular road surface. Therefore, the rigidity of the mounting bushes 9 to 12 need not be set low.

Further, since the rigidity of the mounting bushes 9 to 12 of the lower links 4 and 5 is set high, the horizontal rigidity (that is, the rigidity in the vehicle width direction) of the axle 2 is high. The high horizontal rigidity of the mounting bushes 9 to 12 results in an increased the rigidity of a camber so that steering stability can be increased.

Since the horizontal input to the wheel 1 is applied to the two lower links 4 and 5 in substantially the directions of the link axial lines L1 and L2 even if the rigidity of the connect bushes 20 and 21 is set low, the horizontal rigidity of the axle 2 is not set low. As a result, the rigidity in the forward-backward direction can be set low and the horizontal rigidity can be set high so that the ride quality can be improved and the steering stability can be increased.

In top view, the intersection P5 of the link axial lines L1 and L2 of the respective two lower links 4 and 5 is positioned behind the center between the wheel 1 (wheel center W/C) in the vehicle forward-backward direction so that the rotational center of the axle 2 is positioned behind the wheel center W/C. Therefore, a torque that causes the turning outer wheel 1 to be oriented in a toe-in direction acts in response to an input in a tire horizontal direction when the vehicle is turning. Accordingly, stability during the turning of the vehicle is increased.

In top view, since the intersection P5 of the link axial lines L1 and L2 of the respective two linked lower links 4 and 5 is set outward of the axle 2 in the vehicle width direction, that is, since the span between the wheel-side mounting points P2 and P4 is set narrower than the span between the vehicle-body side mounting points P1 and P3 in the vehicle forward-backward direction, several advantages are provided.

First, when an input in the backward direction in the vehicle forward-backward direction is made to the ground-contact face of the wheel 1, due to, for example, braking, the wheel-side mounting points P2 and P4 of the respective two lower links 4 and 5 are both swung and displaced by substantially the same amount towards the back in the vehicle forward-backward direction. The difference between the displacements of the wheel-side mounting points P2 and P4 of the respective two lower links 4 and 5 in the horizontal direction of the vehicle causes a change in toe to a toe-in direction so that stability is increased during the braking.

Also, in the embodiment shown in FIG. 1, the link axial line L2 of the rear lower link 5 is set substantially in the vehicle width direction. The link axial line L1 of the front lower link 4 is tilted towards the back in the vehicle forward-backward direction so that its wheel side is set towards the back in the vehicle forward-backward direction. As a result, the wheel-side mounting points P2 and P4 of the respective two lower links 4 and 5 are swung and displaced by substantially the same amount towards the back in the vehicle forward-backward direction. The wheel-side mounting point P2 of the front lower link 4 is pulled further towards the vehicle than the wheel-side mounting point P4 of the rear lower link 5 so that the wheels 1 change to the toe-in direction.

Further, it is possible to at least improve the ride quality and increase the steering stability.

Although hollows 20d are described as formed above and below the inner cylinder 20b and 21b in at least one of the connect bushes 20 and 21 to reduce the vertical rigidity with respect to the vehicle width direction, the invention is not limited thereto. For example, the elastic members 20c and 21c of the connect bushes 20 and 21 can be made of a material that is less rigid than the elastic members of the mounting bushes 9 to 12, and intermediate plates, such as metallic plates that are more rigid than the elastic members 20c and 21c, can be interposed between left and right elastic-member portions on both sides of the inner cylinders 20b and 21b so that the connect bushes 20 and 21 have anisotropic properties in which their vertical rigidity is lower than their rigidity in the vehicle width direction.

In addition, by adjusting a balance between the rigidity of the connect bushes 20 and 21 and the rigidity of the mounting bushes 10 and 12 linking the rear lower link 5 to the axle 2 and to the suspension member 3, an elastic principal axis oriented in the vehicle width direction and defined by the bushes 10, 12, 20 and 21 of the rear lower link 5, including the projecting portion 7, is set as close as possible to a shaft of the axle 2 rotatably supporting the wheel 1. Setting the elastic principal axis as close as possible to the shaft of the axle 2 allows the projecting portion 7 to smoothly swing vertically with respect to an input in the wind-up direction. Since a forward-backward input to the suspension can be more effectively changed into a force in the wind-up direction due to the smooth swinging motion of the projecting portion 7, vibration absorption resulting from vertical swinging of the connect bushes 20 and 21 is high. FIG. 5 shows an example in which, in top view, the elastic principal axis matches the rotational axis of the wheels.

An input in the forward-backward direction to the wheel 1 (i.e., a forward-backward input to the wheel center W/C) caused by traveling over a protrusion, for example, is a vibrational input in a low frequency region. In contrast, vibration generating road noise resulting from a relatively small input due to unevenness of a road surface or a tire pattern, for example, is a vibrational input in a high frequency region. Considering the different vibrational inputs, bushes having rigidity properties in which the rigidity is low with respect to the vibration in the low frequency region and the rigidity is high with respect to the vibration in the high-frequency region may be used for the connect bushes 20 and 21. Since the rigidity of the connect bushes 20 and 21 is high with respect to the vibrational input in the high frequency region, swinging between the two lower links 4 and 5 is restricted during high-frequency vibrations. That is, the lower links 4 and 5 are restricted from moving separately so that the transmissive power of the road noise or other high-frequency vibration source is reduced, thereby providing a soundproof effect.

Although the upper link 8 comprises one rod link in the described embodiment, it may comprise two or more rod links, or may be one having a different form, such as an A arm.

Figure 6:
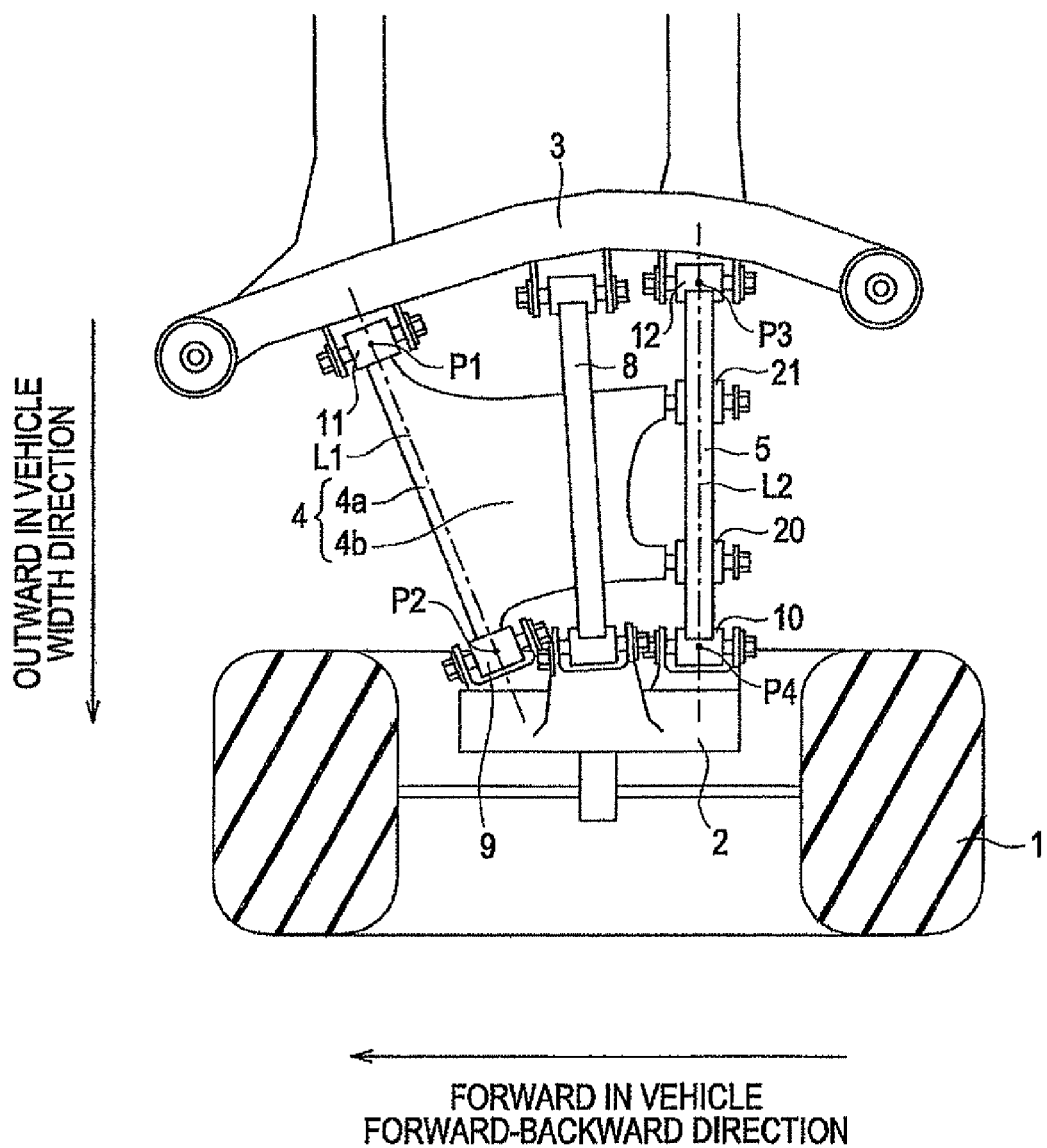
FIG. 6 is a top view illustrating a suspension device with an alternative link arrangement for a vehicle wheel.

In addition, as shown in FIG. 6, both of the lower links 4 and 5 may be linked to each other at a link axial-line-L2 side of the rear lower link 5 through the connect bushes 20 and 21. In this case, the lower link 4 includes a link body 4a and a projecting portion 4b similar to the projecting portion 7. The link body 4a extends along the link axial line L1. The projecting portion 4b is integrated with the link body 4a and projects towards the rear in the vehicle forward-backward direction, from the link body 4a towards the rear lower link 5. The rear lower link is a rod member extending linearly along the link axial line L2.

Further, the connect bushes 20 and 21 linking the two lower links 4 and 5 need not be disposed on either of the link axial lines L1 and L2 of the respective lower links 4 and 5. For example, the bushes 20 and 21 may be disposed at intermediate positions between the two lower links 4 and 5.

Instead of the described projecting portion 7, separate projecting portions can project from the lower link 4 to the lower link 5 and from the lower link 5 to the lower link 4. One of the connect bushes 20 and 21 can then be arranged on each on the axial lines of the lower links 4 and 5, respectively.

The number of connect bushes 20 and 21 linking the two lower links 4 and 5 to each other is not limited to two, so that one bush or three or more bushes may be used.

Also, although the link axial line L2 of the rear lower link 5 is disposed in the vehicle width direction and the link axial line L1 of the front lower link 4 is tilted towards the back in the vehicle forward-backward direction to set the intersection P5 of the link axial lines L1 and L2 of the respective two lower links 4 and 5 further outward than the axle 2 in the vehicle width direction, the invention is not limited thereto. For example, it is possible to dispose the link axial line L1 of the front lower link 4 in substantially the vehicle width direction and to tilt the link axial line L2 of the rear lower link 5 in the forward direction so that the wheel-side mounting point 4 is disposed more towards the front in the vehicle forward-backward direction than the vehicle-body side mounting point P3. The intersection P5 of the link axial lines L1 and L2 of the respective two lower links 4 and 5 is still further outward than the axle 2 in the vehicle width direction.

While the axes of the connect bushes 20 and 21 are disposed so as to be oriented substantially in the vehicle forward-backward direction (that is, in a direction perpendicular to the link axial lines), the invention is not limited thereto. The axes of the connect bushes 20 and 21 may be disposed, for example, in the vehicle width direction or along the link axial lines L1 and L2. However, when the bush axes are oriented in a direction substantially perpendicular to the link axial lines L1 and L2 or in the vehicle forward-backward direction, it is easier to adjust the rigidities of the bushes 20 and 21 in the vertical direction and the vehicle width direction.

Further, though the links 4 and 5 are described as being oriented such that the intersection P5 of the link axial lines L1 and L2 is further outward than the axle 2, the span in the vehicle forward-backward direction between the mounting points P1 and P3 may be equal to the span between the mounting points P2 and P4. That is, the two lower links 4 and 5 may be set parallel to each other.

Figure 2:
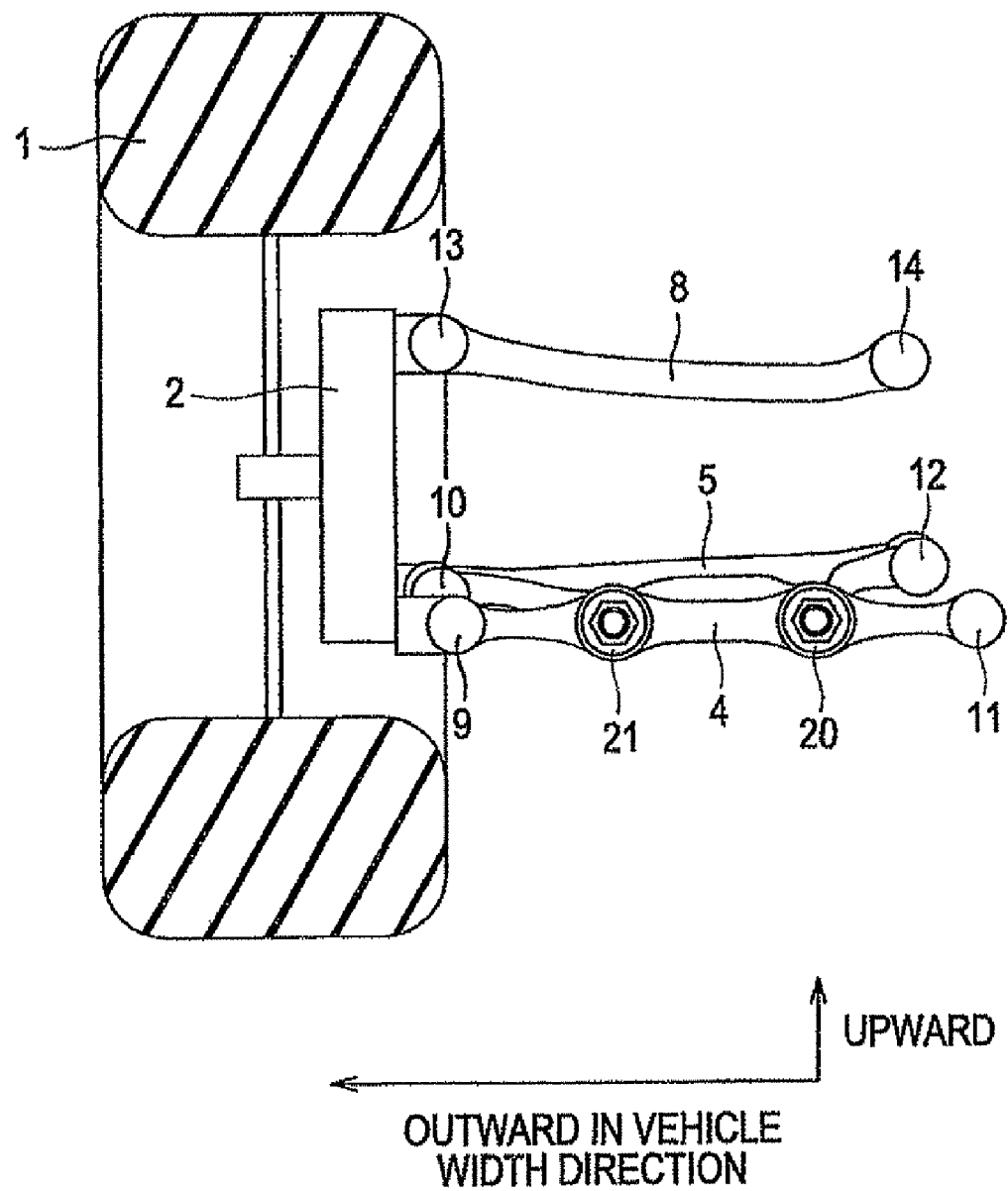
FIG. 2 is a schematic view as seen from the front of a vehicle of a disposition and structure of links in the suspension device for a vehicle wheel according to a first embodiment.

FIGS. 1 and 2 also illustrate a suspension device for rear wheels according to a second embodiment of the suspension device. The basic structure of the suspension device of the second embodiment is similar to structure of the first embodiment, thus the description of the basic structure of the second embodiment is not repeated.

In the second embodiment, however, the elastic bush 10 that links the rear lower link 5 and the axle 2 to each other, hereinafter called a "first elastic bush 10", and the elastic bush 12 that links the rear lower link 5 and the suspension member 3 to each other, hereinafter called a "second elastic bush 12", do not have the same structure as in the first embodiment.

Figure 7:
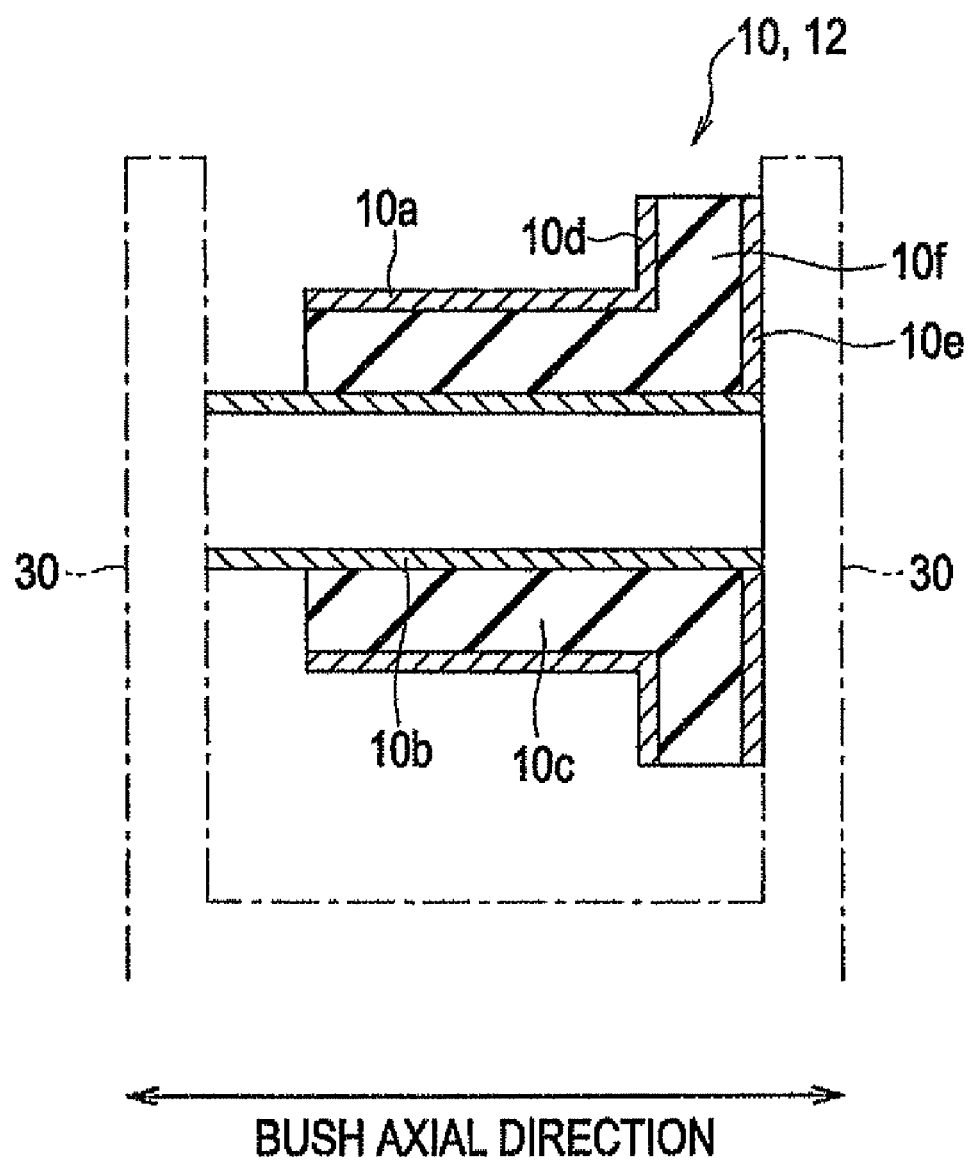
FIG. 7 is a sectional view illustrating a structure of an elastic bush including a rigidity increasing mechanism.

As shown in FIG. 7, the first and second elastic bushes 10 and 12 comprise elastic members 10c that are formed of rubber and inserted between outer cylinders 10a and respective inner cylinders 10b so as to be disposed in a nesting state. In addition, the inner cylinders 10b are longer than the outer cylinders 10a so the inner cylinders 10b project further outward in a bush axial direction than the outer cylinders 10a. Further, an outwardly-oriented, annular flange 10d is integrally formed with one of the end portions of each outer cylinder 10a. An annular member 10e comprising an annular plate member is disposed so as to oppose the corresponding outwardly-oriented, annular flange 10d and so as to be situated spaced-apart in the bush axial direction from outwardly oriented flange 10d. Each annular member 10e is disposed coaxially with the corresponding bush axis, and an inside-diameter end face of each annular member 10e contacts an outer-diameter end face of each inner cylinder 10b. Elastic portions 10f are provided between the outwardly oriented flanges 10d and the respective annular members 10e. FIG. 7 shows an example in which the elastic member 10c is interposed between the inner cylinder 10b and the outer cylinder 10a, and the elastic portion 10f is provided between the outwardly-oriented flange 10d and the annular member 10e. A bracket 30 links the inner cylinder 10b to the axle 2 or the suspension member 3.

When the first elastic bush 10 and the second elastic bush 12 have such a structure, the elastic portions 10f between the outwardly oriented flanges 10d and the respective annular members 10e primarily receive an input in the bush axial direction, that is, an input in the vehicle forward-backward direction. Since the elastic portions 10f are short in the bush axial direction, their rigidity in the bush axial direction, that is, in the vehicle forward-backward direction, is increased.

The inner cylinders 10b and the annular members 10e may be integrally formed with each other or may be separately formed. In addition, the annular members 10e may be simply brought into contact with the elastic portions 10f along the bush axial direction instead of adhering the annular members 10e to the elastic portions 10f by vulcanization. In such a case, sliding between the elastic portions 10f and the annular members 10e occurs with respect to a twisting-direction input that is greater than or equal to a predetermined value, thereby reducing twisting at the elastic portions 10f. Thus, the rigidities of the first elastic bush 10 and the second elastic bush 12 in the vehicle forward-backward direction is higher than the rigidity of the connect bushes 20 and 21 in the vehicle width direction.

The rigidities of the other mounting bushes 9 and 11 are also higher than those of the connect bushes 20 and 21.

The axle 2 constitutes a wheel supporting member, and the suspension member 3 constitutes a vehicle-body side member. Each outwardly oriented flange 10d, each annular member 10e and each elastic portion 10f constitute a rigidity increasing mechanism.

As in the first embodiment, the structure of the suspension device in the second embodiment provides the several advantages and modifications described above with respect to FIGS. 3A to 6, which need not be repeated here.

Additionally, the connect bushes 20 and 21 and the mounting bushes 9, 10 and 12 all aid in absorbing an input to the wheel 1, such as an input resulting from the vehicle traveling over a protrusion.

The rigidities of the bushes 10, 12, 20 and 21 can be balanced such that an elastic principal axis oriented in the vehicle width direction is as close as possible being in alignment with the shaft of the axle 2

That is, if the forward-backward direction rigidity of the first elastic bush 10 is K1, the forward-backward direction rigidity of the second elastic bush 12 is K2, and the rigidity of the connect bushes 20 and 21 in the vehicle width direction is Kc, these values are set so that the following condition (1) is established:

$$K1 \geqq K2 > Kc \tag{1}$$

The rigidity of the connect bushes 20 and 21 in the vehicle width direction is used because, as mentioned above, the connect bushes 20 and 21 are displaced by a greater amount in the vehicle width direction than in the vehicle forward-backward direction in response to an input in the forward-backward direction. It is also desirable that the rigidity of the connect bushes 20 and 21 in the vehicle forward-backward direction be lower than the forward-backward direction rigidity K1 of the first elastic bush 10 and the forward-backward direction rigidity K2 of the second elastic bush 12.

When traveling over a protrusion, the forward-backward direction force is input to the suspension, causing the front lower link 4 and the rear lower link 5 to vibrate by a large amount. If the rigidity of the connect bushes 20 and 21 is high, the front lower link 4 and the rear lower link 5 vibrate together while transmitting the vibration through the connect bushes 20 and 21, so that the vibration transmitted to the vehicle body is large. Since the input orientations are the same, the front lower link 4 and the rear lower link 5 vibrate in phase.

When the rigidity of the connect bushes 20 and 21 is low, the front lower link 4 and the rear lower link 5 vibrate separately.

Since the rigidity of the wheel-side first elastic bush 10 in the vehicle forward-backward direction is the highest, force input in the forward-backward direction becomes concentrated at the first elastic bush 10, and the displacement of the rear lower link 5 in the vehicle forward-backward direction is reduced. Thus, input to the second elastic bush 12 and the connect bushes 20 and 21 is reduced.

As a result, the vibration level of the input to the front lower link 4 from the rear lower link 5 through the connect bushes 20 and 21 is reduced. Vibration of the rear lower link 5 caused by vibration of the front lower link 4 is also reduced. Therefore, the rear lower link 5 is vibrated less frequently, so the transmission of the vibration towards the vehicle body is correspondingly reduced.

Energy is absorbed as a result of swinging and displacing the mounting bushes 9 to 12, and energy is also absorbed as a result of swinging and displacing the connect bushes 20 and 21 (which are not directly involved in mounting the links 4 and 5 to the axle 2 and to the suspension member 3), thereby reducing the vibration transmitted to the vehicle body. In particular, a large amount of vibration is absorbed by reducing the rigidity of the connect bushes 20 and 21 in the vehicle width direction.

Simulations comparing a suspension device with condition (1) satisfied to a suspension device in which all bushes 9 to 12 and 20 and 21 have the same rigidity demonstrate the effectiveness of rigidity balancing at reducing vehicle body vibrations. When K1:K2:Kc=6:4:1 (i.e., when the rigidity balance criteria of condition (1) are satisfied), the vibration peak of a floor forward-backward vibration was reduced by 20% compared to the case in which K1=K2=Kc.

Further, as the vehicle forward-backward direction rigidity K2 of the second elastic bush 12 approximates the vehicle forward-backward direction rigidity K1 of the first elastic bush 10, that is, when (K1/K2)<(K2/Kc), though desirably when (K2/K1)≅1, a vibration reduction effect of the rear lower link 5 becomes large. Therefore, the transmission of the vibration to the vehicle body can be reduced.

In other words, when the vehicle forward-backward direction rigidity K2 of the second elastic bush 12 is made high, damping of the transmission of the vibration from the rear lower link 5 towards the vehicle body by the second elastic bush 12 is high. Thus, it is possible to further reduce the vibration that is transmitted to the vehicle body.

Simulations comparing a suspension device wherein (K2/K1)≅1 is satisfied to a suspension device in which all bushes 9 to 12 and 20 and 21 have the same rigidity demonstrate the effectiveness of increasing K2 at reducing vehicle body vibrations. When K1:K2:Kc=6:6:1, the vibration peak of a floor forward-backward vibration was reduced by 33% compared to the case in which K1=K2=Kc. That is, the simulations confirm that the vibration reduction effect is greater when (K2/K1)≅1 than when K1≧K2.

Further, although the rigidity of the elastic bushes in the bush axial direction is generally low, providing the rigidity increasing mechanism makes it possible to set the axial-direction rigidity of at least the first elastic bush 10 among the first elastic bush 10 and the second elastic bush 12 high. Thus, it is possible to reliably increase the rigidity of the suspension device in the vehicle forward-backward direction.

The vehicle forward-backward direction rigidity of the mounting bush 9 may be higher or lower than the vehicle forward-backward direction rigidity K1 of the first elastic bush 10. However, it is desirable that the vehicle forward-backward direction rigidity of the mounting bush 9 be higher than the vehicle-width direction rigidity Kc of the connect bushes 20 and 21.

The above-described embodiment illustrates a case in which a rigidity increasing mechanism is provided at a bush whose axis is oriented in the vehicle forward-backward direction or in substantially the vehicle forward-backward direction as shown in FIG. 7. When the bush axis can be disposed vertically as shown in FIGS. 9A and 9B, intermediate plates 10g that are more rigid than the elastic member 10c are disposed in the elastic member 10c so as to be situated in front of and behind the inner cylinder 10b in the vehicle forward-backward direction. The intermediate plates 10g increase the rigidity of the bush 10, 12 in the vehicle forward-backward direction. The intermediate plates 10g are another example of the rigidity increasing mechanism.

The rigidity increasing mechanism may also be used in the mounting bush 9 to increase its rigidity in the vehicle forward-backward direction.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A suspension device, comprising:
   a wheel supporting member configured to rotatably support a wheel;
   a first link and a second link respectively linking the wheel supporting member and a vehicle-body side member and disposed substantially in parallel in a vehicle width direction;
   a first elastic member disposed between and linking the first link and the wheel supporting member;
   a second elastic member disposed between and linking the first link and the vehicle-body side member;
   a projecting portion comprising two protrusions that extend from the first link towards the second link; and
   a plurality of elastic linking portions, each linking a respective protrusion of the projecting portion of the first link to the second link.

2. The suspension device according to claim 1 wherein a rigidity of at least one of the elastic linking portions in a vehicle vertical direction is less than a rigidity of the elastic linking portion in a vehicle width direction.

3. The suspension device according to claim 1 wherein the elastic linking portions are disposed apart from each other in the vehicle width direction and define an elastic center, and wherein at least one of the elastic linking portions is disposed between the elastic center and the wheel supporting member in the vehicle width direction and has a lower rigidity in the vehicle vertical direction than in the vehicle width direction.

4. The suspension device according to claim 1 wherein a rigidity at least one of the elastic linking portions in a vehicle width direction is less than a rigidity of the first elastic member in the vehicle forward-backward direction and a rigidity of the second elastic member in the vehicle forward-backward direction.

5. The suspension device according to claim 4 wherein the rigidity of the first elastic member in the vehicle forward-backward direction is greater than the rigidity of the second elastic member in the vehicle forward-backward direction.

6. The suspension device according to claim 5 wherein rigidities of the first elastic member in the vehicle forward-backward direction, the second elastic member in the vehicle forward-backward direction and at least one of the elastic linking portions in the vehicle width direction satisfy the following formula:

$$(K1/K2)<(K2/Kc); \text{ wherein}$$

K1 is the rigidity of the first elastic member in the vehicle forward-backward direction;
K2 is the rigidity of the second elastic member in the vehicle forward-backward direction; and
Kc is the rigidity of the elastic linking portion in the vehicle width direction.

7. The suspension device according to claim 1 wherein one of the first elastic member and the second elastic member includes a rigidity increasing device configured to increase the rigidity in the vehicle forward-backward direction of the one of the first elastic member and the second elastic member including the rigidity increasing device.

8. The suspension device according to claim 7 wherein the one of the first elastic member and the second elastic member including the rigidity increasing device comprises:
   an elastic component interposed between an inner cylinder having a longitudinal axis extending substantially in the vehicle forward-backward direction and an outer cylinder shorter than the inner cylinder; and wherein the rigidity increasing device includes a radially-extending flange at an end of the outer cylinder along the longitudinal axis, an annular member at an end of the inner cylinder along the longitudinal axis and spaced apart from the radially-extending flange, and an elastic portion interposed between the radially-extending flange and the annular member.

9. The suspension device according to claim 7 wherein the one of the first elastic member and the second elastic member including the rigidity increasing device comprises:
an elastic component interposed between an inner cylinder having a longitudinal axis extending substantially in a vehicle vertical direction and an outer cylinder circumscribing the inner cylinder, and at least one plate disposed in the elastic member adjacent to the inner cylinder in the vehicle forward-backward direction.

10. The suspension device according to claim 4 wherein a rigidity of at least one of the elastic linking portions in a vehicle vertical direction is less than the rigidity of the elastic linking portion in the vehicle width direction.

11. The suspension device according to claim 1 wherein the first elastic member, the second elastic member, and at least one of the elastic linking portions define an elastic principal axis extending in the vehicle width direction and aligned with an axis of the wheel in the vehicle forward-backward direction.

12. The suspension device according to claim 1 wherein the rigidity of the first elastic member in the vehicle forward-backward direction, the rigidity of the second elastic member in the vehicle forward-backward direction and the rigidity of at least one of the elastic linking portions in the vehicle width direction satisfy the following formula:

(K1/K2)<(K2/Kc); wherein

K1 is the rigidity of the first elastic member in the vehicle forward-backward direction;
K2 is the rigidity of the second elastic member in the vehicle forward-backward direction; and
Kc is the rigidity of the elastic linking portion in the vehicle width direction.

13. The suspension device according to claim 1 wherein one of the first elastic member and the second elastic member includes:
means for increasing a rigidity in the vehicle forward-backward direction of the one of the first elastic member and the second elastic member.

14. The suspension device according to claim 13 wherein the one of the first elastic member and the second elastic member including the increasing means comprises:
an elastic component interposed between an inner cylinder having a longitudinal axis extending substantially in a vehicle vertical direction and an outer cylinder circumscribing the inner cylinder; and
at least one plate disposed in the elastic member adjacent to the inner cylinder in the vehicle forward-backward direction.

15. The suspension device according to claim 1 wherein one of the first elastic member and the second elastic member further comprises:
an elastic component interposed between an inner cylinder having a longitudinal axis extending substantially in the vehicle forward-backward direction and an outer cylinder shorter than the inner cylinder, a radially-extending flange at an end of the outer cylinder along the longitudinal axis, an annular member at an end of the inner cylinder along the longitudinal axis and spaced apart from the radially-extending flange, and an elastic portion interposed between the radially-extending flange and the annular member.

16. The suspension device according to claim 1, wherein at least one of the plurality of elastic linking portions has a rigidity less than a rigidity of the first elastic member and a rigidity of the second elastic member.

17. A suspension device for a wheel supporting member configured to rotatably support a wheel, the device comprising:
first means for linking the wheel supporting member and a vehicle-body side member;
second means for linking the wheel supporting member and the vehicle-body side member, the second linking means disposed substantially in parallel with the first linking means in a vehicle width direction;
first means for linking the first means for linking the wheel supporting member and a vehicle-body side member to the second means for linking the wheel supporting member and the vehicle-body side member;
second means for linking the first means for linking the wheel supporting member and a vehicle-body side member to the second means for linking the wheel supporting member and the vehicle-body side member;
means for increasing a relative displacement between the first means for linking and the second means for linking;
means for generating a force in accordance with a change in the relative displacement wherein the relative displacement includes a periodic displacement; and
means for generating a counter force in accordance with the periodic displacement included in the relative displacement.

18. A method of supporting a wheel rotatably supported by a wheel supporting member, the method comprising:
displacing two links relative to each other in accordance with a displacement of the wheel supporting member in a vehicle forward-backward direction, the two links linking the wheel supporting member and a vehicle-body side member to each other and disposed substantially in parallel in a vehicle width direction; and
generating a damping force responsive to a periodic displacement included in the displacement wherein generating the damping force includes generating a greater force component at a location where one of the two links is linked to one of the wheel supporting member and the vehicle-body side member than at two protrusions where the two links are linked to each other.

19. The method according to claim 18 wherein the periodic displacement is in at least one of a vehicle vertical direction and a vehicle width direction.

* * * * *